United States Patent Office 2,739,073
Patented Mar. 20, 1956

2,739,073

SILICATE PIGMENTS

Orlando Leonard Bertorelli, Borger, Tex., assignor to J. M. Huber Corporation, New York, N. Y., a corporation of New Jersey No Drawing. Application September 6, 1950,
Serial No. 183,467

16 Claims. (Cl. 106—288)

This invention relates to finely divided mineral pigments and, more particularly, to the production of new white silicate pigments chemically analogous to zeolites but having very fine particle sizes, unusual brightness and other special properties which make them valuable for use in rubber compounds, paper coatings, inks, paints, plastics and similar materials.

Natural alkali metal zeolites such as natrolite $$(Na_2O.Al_2O_3.3SiO_2.2H_2O)$$

and analcine $$(Na_2O.Al_2O_3.4SiO_2.H_2O)$$

are known to possess water softening properties but to have no usefulness as pigments. It also is well known that alkali silicates such as water glass can be reacted with aluminum sulfate to form gels which after drying are granular in nature and possess base exchange properties. Artificial zeolites of that type contain sodium, aluminum and silicon oxides in various proportions which usually are controlled by the addition of sodium aluminate during the reaction. In dried condition, they are hard granules having sharp edges and are exceedingly difficult to pulverize. Such artificial zeolites also lack essential characteristics of pigments.

It is an obect of the present invention to provide valuable new white pigments of the character described above, and another object is to provide a commercially practical method of producing such pigments.

A further object is to provide ways of reacting alkali metal silicates and water soluble aluminum salts so as to produce new finely divided or powdery white substances of exceedingly small particle size, the particles of the reaction products being substantially all less than one micron in diameter and for the most part less than one-half micron in diameter.

More specific objects of this invention are to provide new silicate pigments which are especially useful in rubber compounds to increase the tear resistance of the rubber, and also to provide new white pigments especially useful in paper coatings as a means of imparting high brightness to coated paper.

It has now been discovered that silicate pigments fulfilling the above-mentioned and other important uses can be provided in the form of white powdery reaction products of water soluble alkali metal silicates and water soluble salts of aluminum and strong acids. These products are compositions essentially of alkali metal, aluminum and silicon oxides, obtained in extremely small particle sizes, as very fine precipitates, by suitably comingling and reacting together at very low concentrations dilute aqueous solutions of an alkali silicate and a water soluble aluminum salt such as aluminum sulfate, aluminum chloride, aluminum nitrate or ammonium alum. The precipitate pigment particles are substantially all less than one micron in diameter, and they average less than one-half micron in diameter; moreover, they are characterized by extraordinary brightness and by other qualities as hereinafter described which make them exceptionally valuable for uses of the nature indicated above.

When a dilute solution of an alkali silicate is mixed and reacted with a dilute solution of such an aluminum salt by pouring the two solutions directly together, the immediate result is the formation of a gel which may hold all the liquid present but still forms a solid mass. Although this mass can be broken up into small pieces by agitation, the pieces when dried are coarse and hard and are entirely unsuitable for pigment purposes. A gell formation of this nature occurs even when the two solutions are combined at concentrations as low as 0.5 molar.

According to this invention, it has been found that a distinctly different effect yielding pigments of the type described can be obtained by maintaining the reactant solutions at very low concentrations and under strong agitation during the process of mingling and reacting them together. In general, the concentration of the solutions at the point of reaction should average less than about 0.1 molar, depending somewhat upon the particular reactants employed, their purity and other variables. In preferred embodiments the reacting concentration probably is not more than about .01 molar.

The most satisfactory procedure for the purposes of this invention is to run dilute solutions of the reactants slowly into a diluting aqueous medium such as a body of water, preferably at widely spaced locations therein, while continuously and vigorously stirring the reaction material so as to keep it in a fluid condition. The alkali silicate solution so used should be of about 2 molar or lower concentration, and the concentration of the aluminum salt solution should be about 1 molar or lower; while the volume of water which receives these solutions should be at least half their combined volume and preferably is greater than their combined volume. Although the reaction material may thicken somewhat as the precipitation proceeds, at the end it is a fluid mass from which the precipitated solids are easily separated by filtration, and the resulting filter cake when dried is a soft white mass that readily disintegrates into exceedingly small pigment particles.

Another useable procedure is to combine slowly a very dilute stream of the silicate solution, having a concentration less than about 0.4 molar, with a similarly dilute stream of the aluminum salt solution while strongly agitating the reaction material, so that the water formed by reaction of the parts first combined soon serves as a diluting medium for completion of the precipitation at very low reactant concentrations. The desired pigment forming reaction occurs under highly alkaline conditions; so it is also practicable to place all of a dilute alkali silicate solution in a reaction container and then to run in very slowly a highly dilute solution of the aluminum salt while strongly agitating the material. This practice, however, is troublesome in requiring a more highly diluted inflow solution.

Accordingly, the preferred procedure for practicing this invention involves placing in a suitable vessel provided with a strong agitator an amount of water equal to at least half the volume of the solutions to be added and then, while continuously stirring the contents, introducing dilute solutions of the reactants in streams entering the water at widely spaced points. A high degree of dilution of each solution is thus assured before the solutions contact and react with each other. In a simple and effective arrangement, a propeller type agitator may be employed, and one solution may be added to the vortex which it creates while the other solution is added near the wall of the vessel. Alternatively, the two solutions may be introduced into the vessel at different levels one of which is below the surface and the other at the surface on the agitated liquid.

The solutions should be combined at such relative inflow rates that the reaction material is maintained in an alkaline condition during most of the reaction and at the end thereof. A fine powder is easily obtained in this way. In making a product to be used in rubber, the pH of the reaction material should be held between about 8 and 12, preferably between about 9 and 11, until all the alkali silicate has been added, and then the addition of the aluminum salt solution preferably is continued until the pH is reduced to between 8 and 9.5.

Upon completion of the reaction procedure the precipiated pigment is usually separated from the reaction liquid by filtration, but other means of separation such as centrifuging can be used as well. It generally is desirable to wash the freshly separated pigment with water to remove water soluble salts and the like, after which it may be dried in any suitable manner to obtain a friable mass which easily disintegrates into a fine powder. The drying preferably is performed at elevated temperatures. When dried at 110° C. the finished pigments usually contain about 9 to 11% water, but this can be driven off by heating them at considerably higher temperatures, for example, to about 500° C.

Water-soluble potassium silicates and sodium silicates can be used similarly according to this invention, but the much less expensive sodium silicates naturally are preferred. They are effective in any composition in which the ratio of $SiO_2$ to alkali metal oxide is from 1 to about 3.5, including the common alkali silicates ranging from the meta silicate $Na_2O.SiO_2$ to ordinary water glass with a composition of about $Na_2O.3.36SiO_2$. Special pigment properties rendering the products especially effective for certain uses may be promoted, however, by selection of the silicate composition to be used.

Thus it has been found that exceedingly effective pigments for use in rubber compounding, i. e., fine alkali aluminum silicate powders which greatly improve the tear resistance of rubber compounds containing them, can be obtained as substantially silica-free reaction products of an alkali meta silicate such as $Na_2O.SiO_2$ with an aluminum salt such as aluminum sulfate. To obtain such products a dilute solution of sodium meta silicate preferably is reacted with a dilute solution of aluminum sulfate in the manner above described. Valuable rubber pigments of this type can also be obtained, however, by using alkali silicates which contain from more than 1 to about 3.36 molar equivalents of $SiO_2$ to each molar equivalent of alkali metal oxide and, at the end of the described reaction procedure, adding and vigorously stirring into the reaction material an alkaline earth hydroxide solution such as a solution of $Ca(OH)_2$ in an amount approximately sufficient to react with the silica content in excess of a ratio of 1 $SiO_2$ to 1 $Na_2O$. The pigments thus obtained are believed to be composed of fine calcium silicate coprecipitated with a fine reaction product of sodium meta silicate and aluminum sulfate. While the conversion of excess silica into calcium silicate or the like is not necessary, this is important to the use of the pigments in rubber compounds because it overcomes a retarding effect on vulcanization which occurs when the pigments contain excess silica.

It has also been found, however, that the pigments prepared from the alkali silicates of higher silica content are excellently suited for the preparation of paper coating colors. Products of this type are prepared in the described manner from silicates which contain $SiO_2$ in a molar ratio of from about 1.5 to about 3.5 to their content of $Na_2O$, such as disilicates and ordinary water glass. These pigments exhibit a brightness in excess of 90 as measured by a General Electric reflectance meter. Their particles not only are extremely small, being generally less than ½ micron in diameter, but they also have a distinct softness and other desired properties in conjunction with their extreme brightness, which make them particularly valuable as a means for imparting high brightness to paper coatings.

The specific gravity of the present products ranges from about 2.10 for pigments prepared from aluminum sulfate and sodium metal silicate to about 2.26 for pigments prepared from aluminum sulfate and ordinary water glass. The pigments prepared from sodium meta silicate are completely soluble in a hot 20% solution of sodium hydrogen sulfate, while those prepared from silicates having a higher silica content are only partially soluble therein. It is believed that in all cases the pigment contains the same reaction product as that which forms when using the meta silicate, but that this product is mixed with silica when silicates having a higher silica content are used. Small amounts of sulfate also are generally present, being trapped in the pigment.

The following examples are illustrative and indicate preferred ways of producing valuable finely divided pigments according to this invention:

Example 1

A 650-gallon kettle was provided with a propeller type agitator having a blade 10 inches in diameter rotatable at 900 R. P. M. A dilute alkali silicate solution was prepared by dissolving 285 lbs. of sodium meta silicate ($Na_2O.SiO_2$) in 136 gals. of water, and a dilute solution of aluminum sulfate ($Al_2(SO_4)_3$) was prepared by dissolving 187 lbs. thereof in 169 gals. of water. The kettle was charged with 185 gals. of water, and the agitator was started. Then the silicate solution was run in a thin stream directly into the vortex formed by the rotating propeller, and at the same time the aluminum sulfate solution was introduced, also in a thin stream, so as to strike the surface of the vigorously agitated liquid near the wall of the kettle. Addition of both solutions continued for about 15 minutes, during which the rates of inflow were regulated so that the pH of the material stayed between 8 and 12. All the silicate solution having then been added, the addition of the aluminum sulfate solution was continued until the pH had dropped to 9.5. A total of 168 gals. of the alum solution was used. The temperature during the reaction was 26°–32° C. Agitation of the reaction material was continued for an additional 15 minutes, and then the precipitate was separated by the filtration and thoroughly washed with water. The resulting filter cake was dried at 110° C. to obtain a friable cake which disintegrated readily into a powder when squeezed. This cake was passed once through a screen mill with the screen removed, in order to convert the agglomerated mass completely into a fine powder. The yield was 623 lbs.

The material so produced was a fine white powder of which all the particles were less than 0.5 micron in diameter, and about 97% of the particles were less than 0.1 micron in diameter. Its specific gravity was 2.10. Analysis of the product showed the following composition:

| | Per cent |
|---|---|
| Ignition loss (water content) | 10.20 |
| $SiO_2$ | 51.10 |
| $Al_2O_3$ | 24.81 |
| $Na_2O$ | 13.03 |
| $SO_3$ | 0.94 |

This pigment was tested in the following rubber compounds:

| | Gms. |
|---|---|
| Smoked sheets | 100.0 |
| Zinc oxide | 5.0 |
| Sulfur | 3.5 |
| Stearic acid | 1.5 |
| Dibenzo thiazyl dimethyl thiol urea | 1.0 |
| Di ortho tolyl guanidine | 0.5 |
| Pigment | 52.5 |

After having been vulcanized for 8 minutes at 287° F., this rubber compound showed an abrasion loss of 16 cc. and a tear resistance of 443 lbs. Another rubber compound was prepared and tested in the same way, except that the best grade of kaolin, a natural aluminum silicate, was substituted in the same volume for the new pigment of this invention. The abrasion loss of this other compound was 29 cc. and its tear resistance was only 137 lbs.

*Example 2*

This example was performed by use of the same equipment as described in Example 1. The kettle was charged with 88 gallons of water at room temperature. A silicate solution was prepared by dissolving 272 lbs. of a sodium silicate having the composition $Na_2O.1.91SiO_2$ in 176 gallons of water, and an alum solution was prepared by dissolving 147 lbs. of aluminum sulfate $(Al_2(SO_4)_3)$ in 103 gallons of water. The two solutions were run during 12 minutes into the strongly agitated water, at rates regulated so that the pH of the material remained between 8 and 12. After adding all the silicate solution the final pH was adjusted to 8.7 by further addition of alum, whereupon agitation alone was then continued for about 30 minutes. The precipitate then present was filtered off, dried and pulverized as described in Example 1.

Substantially all of the particles of the resulting powder were smaller than 0.2 micron in diameter. The specific gravity of the pigment was 2.20. Its brightness as measured on a General Electric reflectance meter was 95.7. Analysis of the pigment showed the following composition:

|  | Per cent |
| --- | --- |
| Ignition loss (water content) | 11.19 |
| $SiO_2$ | 59.10 |
| $Al_2O_3$ | 15.65 |
| $Na_2O$ | 12.10 |
| $SO_3$ | 1.92 |

A casein paper coating color was prepared to contain 22 parts of casein and 100 parts of the above pigment. This was applied to paper to form a coating which, though uncalendered, showed a brightness of 84.6. An uncalendered coated paper similarly prepared by use of a color containing 22 parts of casein and 100 parts of high grade water-washed kaolin showed a brightness of about 75.

In the pigment products of the foregoing examples, the ratio of $Na_2O$ to $Al_2O_3$, after making allowance for the amount of sodium combined with $SO_3$, falls within the range of about .8 to 1.12 molar equivalents of $Na_2O$ for each molar equivalent of $Al_2O_3$. This ratio may vary from as little as 0.80 to as high as 1.20, but it always remains within this relatively narrow range for all of the various pigments produced. The amount of $SiO_2$ present in these pigments naturally varies more widely, being dependent upon the type of silicate employed and greatest in the use of ordinary water glass. The pigment product prepared by the use of sodium metasilicate, as shown by calculations from the analysis given in Example 1, contains $SiO_2$ and $Na_2O$ in a molar ratio of about 4 to 1. When the silicate used contains substantially more silica than is present in the metasilicate, the molar ratio of $SiO_2$ to $Na_2O$ in the product is substantially greater than 4 to 1, as shown by calculations from the analysis given in Example 2.

*Example 3*

A pigment was prepared exactly as in Example 2, except that when the reaction was complete, a slurry of 59 lbs. of calcium hydroxide in 88 gallons of water was run quickly into the reaction material, and the mixture was then stirred for 30 minutes before filtration. The resulting pigment was essentially a mixture or complex of a sodium aluminum silicate and a calcium silicate or other CaO containing substance, in the form of a white amorphous powder having no particles larger than .5 micron in diameter. The ratio of $Na_2O$ to $Al_2O_3$ in this preparation was 1.08 to 1.

In other examples similar to those described, valuable sodium aluminum silicate pigments have been prepared by use of sodium silicates containing, respectively, 1.4, 1.83, 2.34, 2.8, and 3.3 mols of $SiO_2$ to 1 mol of $Na_2O$. The pigments obtained in these practices possessed properties similar to those already described.

The new pigments produced according to this invention are particularly useful, as hereinbefore indicated, in paper coating colors and in the preparation of rubber compounds. They are useful not only in natural rubber compounds but also in compounds of various synthetic rubbers or elastomers, such as chloroprene polymers, butadiene polymers, butene polymers, and the like. They also are valuable pigments for use in paints, plastics, inks, protective coating compositions, and other similar materials wherein stable pigments of an exceedingly fine particle size and/or of high brightness properties are desired.

It will be understood that the foregoing detailed description and examples are illustrative only, for many variations and changes may be made in the reactants and in conditions of the process or the products without departing from the substance of the invention as herein disclosed and defined in the appended claims.

I claim:

1. As a new pigment, precipitated white powdery composition consisting essentially of oxides of sodium, aluminum and silicon substantially all the particles of which are less than 0.5 micron in diameter, wherein the molar ratio of $SiO_2$ to $Na_2O$ is at least about 4 to 1 and the molar ratio of $Na_2O$ to $Al_2O_3$ is from .8 to 1.2 to 1, said composition having a specific gravity of from 2.10 to 2.26.

2. As a new rubber pigment, a precipitated powdery composition consisting essentially of oxides of sodium, aluminum and silicon substantially all the particles of which are less than 0.5 micron in diameter, wherein the molar ratio of $SiO_2$ to $Na_2O$ is about 4 to 1 and the molar ratio of $Na_2O$ to $Al_2O_3$ is from .8 to 1.2 to 1, said composition having a specific gravity of from 2.10 to 2.26.

3. As a new paper coating pigment, a precipitated white powdery composition consisting esentially of oxides of sodium, aluminum and silicon substantially all the particles of which are less than 0.5 micron in diameter, and having a brightness in excess of 90 as measured by a General Electric reflectance meter, wherein the molar ratio of $SiO_2$ to $Na_2O$ is substantially greater than 4 to 1 and the molar ratio of $Na_2O$ to $Al_2O_3$ is from .8 to 1.2 to 1, said composition having a specific gravity of from 2.10 to 2.26.

4. The process of producing a fine white sodium aluminum silicate pigment which comprises, while strongly agitating a body of a diluting aqueous medium, running slowly thereinto at spaced points therein a dilute aqueous solution of sodium silicate at not more than 2 molar concentration and a dilute aqueous solution of a salt of aluminum and a mineral acid, said salt solution being at not more than 1 molar concentration, said sodium silicate containing $SiO_2$ and $Na_2O$ in a ratio of from 1 to 3.5 to 1 and the combined solutions providing amounts of sodium and aluminum equivalent to a $Na_2O:Al_2O_3$ ratio of from .8 to 1.2 to 1, and keeping the resulting slurry alkaline during the reaction, thereby producing in a fluid reaction slurry very fine white precipitate particles composed principally of oxides of sodium, aluminum and silicon and substantially all less than 1 micron in diameter.

5. A process as described in claim 4, the initial volume of said diluting medium being at least half the combined volume of said solutions.

6. A process as described in claim 4, the reaction slurry being held between pH 8 and 12 while combining said solution and being brought finally to a pH between 8 and 9.5.

7. The process of producing a pigment valuable in rubber compounds, which comprises comingling and reacting in a dilute aqueous slurry, while strongly agitating the slurry, and holding its pH between about 8 and 12, a dilute aqueous solution of aluminum sulfate at not more than 1 molar concentration and a dilute aqueous solution of a sodium silicate containing SiO₂ in a molar ratio to Na₂O of from more than 1 to about 3.36, the silicate solution being at not more than 2 molar concentration, thereby producing in said slurry a very fine precipitate composed essentially of oxides of sodium, aluminum and silicon, then incorporating into said slurry during strong agitation thereof an amount of alkaline earth hydroxide approximately sufficient to react with the SiO₂ content of said silicate solution in excess of an equimolecular ratio of SiO₂ to its Na₂O content, and then separating, drying and disintegrating the resulting precipitate to obtain discrete particles averaging less than 0.5 micron in diameter which enhance tear resistance in rubber compounds.

8. The process of producing a white pigment especially valuable in paper coatings, which comprises commingling and reacting in a dilute aqueous slurry, while strongly agitating the slurry and keeping it alkaline, a dilute aqueous solution of aluminum sulfate at not more than 1 molar concentration and a dilute aqueous solution of a sodium silicate containing SiO₂ in a molar ratio to Na₂O of about 1.5 to 3.5, the silicate solution being at not more than 2 molar concentration, thereby producing in said slurry a very fine precipitate composed essentially of oxides of sodium, aluminum and silicon, and then separating, drying and disintegrating said precipitate to obtain discrete particles averaging less than 0.5 micron in diameter which have a specific gravity of about 2.10 to 2.26 and a brightness in excess of 90 as measured by a General Electric reflectance meter.

9. As a new pigment, a precipitated white powdery composition consisting essentially of oxides of sodium, aluminum and silicon, in which the molar ratio Na₂O:Al₂O₃ is from 0.8 to 1.2:1 and the molar ratio of SiO₂ to Na₂O is at least about 4 to 1, substantially all particles of which are less than 1 micron in diameter, said composition having a specific gravity of from 2.10 to 2.26.

10. As a new pigment, a precipitated white powdery composition consisting essentially of oxides of sodium, aluminum, silicon and an alkaline earth metal, in which the molar ratio Na₂O:Al₂O₃ is from 0.8 to 1.2:1 and the molar ratio SiO₂:Na₂O is at least about 4 to 1, substantially all particles of which are less than 1 micron in diameter, said composition having a specific gravity of from 2.10 to 2.26.

11. As a new pigment, a precipitated white powdery composition consisting essentially of oxides of sodium, aluminum, silicon and calcium, in which the molar ratio Na₂O:Al₂O₃ is from 0.8 to 1.2:1, the molar ratio of SiO₂:Na₂O is more than 4 to 1 and the CaO content is approximately equivalent stoichiometrically to the amount of SiO₂ in excess of that satisfying a SiO₂:Na₂O ratio of 4:1, substantially all particles of which are less than 1 micron in diameter, said composition having a specific gravity of from 2.10 to 2.26.

12. The process of producing a fine white pigment, which comprises continuously combining into a dilute aqueous slurry, while strongly agitating the slurry and keeping it alkaline, a stream of an aqueous sodium silicate solution at less than about 0.4 molar concentration and a stream of an aqueous solution of a salt of aluminum and a mineral acid at less than about 0.4 molar concentration, the silicate having a SiO₂:Na₂O ratio of from 1 to 3.5:1 and said streams providing amounts of sodium and aluminum equivalent to a Na₂O:Al₂O₃ ratio of from 0.8 to 1.2:1, thereby producing in said slurry extremely fine white precipitate particles composed essentially of oxides of sodium, aluminum and silicon and substantially all less than 1 micron in diameter.

13. The process of producing a fine white pigment, which comprises adding slowly into a dilute aqueous slurry, while strongly agitating the slurry and keeping it alkaline, an aqueous sodium silicate solution at not more than 2 molar concentration containing Na₂O and SiO₂ in a ratio of from 1 to 3.5:1, and an aqueous solution of a salt of aluminum and a mineral acid at not more than 1 molar concentration, the combined solutions providing amounts of sodium and aluminum equivalent to a Na₂O:Al₂O₃ ratio of from 0.8 to 1.2:1, thereby producing in said slurry extremely fine white precipitate particles composed essentially of oxides of sodium, aluminum and silicon and substantially all less than 1 micron in diameter.

14. The process of producing a fine white pigment, which comprises adding slowly into a dilute aqueous slurry, while strongly agitating the slurry and keeping it alkaline, an aqueous sodium silicate solution at not more than 2 molar concentration containing Na₂O and SiO₂ in a ratio of from more than 1 to 3.36:1, and an aqueous solution of a salt of aluminum and a mineral acid at not more than 1 molar concentration, the combined solutions providing amounts of sodium and aluminum equivalent to a Na₂O:Al₂O₃ ratio of from 0.8 to 1.2:1, and then adding into said slurry an alkaline earth metal hydroxide to neutralize excess silica therein, thereby producing in said slurry extremely fine precipitate particles composed essentially of oxides of sodium, aluminum, silicon and alkaline earth metal and substantially all less than 1 micron in diameter.

15. The process which comprises commingling and reacting in a dilute aqueous medium, while keeping the medium alkaline and strongly agitating it so as to maintain the average reacting concentration at not more than about .01 molar, a dilute aqueous solution of an alkali metal silicate at not more than 2 molar concentration and a dilute aqueous solution of a salt of aluminum and a mineral acid, said salt solution being at not more than 1 molar concentration, said silicate containing SiO₂ and Na₂O in a ratio of from 1 to 3.5 to 1 and the commingled solutions providing amounts of sodium and aluminum equivalent to a Na₂O:Al₂O₃ ratio of from .8 to 1.2 to 1, thereby producing in said medium very fine white precipitate particles composed principally of alkali metal, aluminum and silican oxides and substantially all of which are less than 1 micron in diameter.

16. The process of producing a pigment valuable in rubber compounds, which comprises slowly commingling and reacting in a dilute aqueous medium, while strongly agitating the medium and keeping it alkaline, a dilute aqueous solution of sodium meta silicate at not more than 2 molar concentration and a dilute aqueous solution of aluminum sulfate at not more than 1 molar concentration, the commingled solutions providing amounts of sodium and aluminum equivalent to a Na₂O:Al₂O₃ ratio of from 0.8 to 1.2 to 1 and the pH of said medium being held between 8 and 12 throughout the reaction, thereby producing in said medium an extremely fine precipitate composed essentially of oxides of sodium, aluminum and silicon and substantially all the particles of which are less than 0.5 micron in diameter, and separating, drying and disintegrating said precipitate to obtain a pigment which enhances tear resistance in rubber compounds.

References Cited in the file of this patent

UNITED STATES PATENTS

| | | |
|---|---|---|
| 1,343,927 | Massatsch | June 22, 1920 |
| 1,842,394 | Endres | Jan. 26, 1932 |
| 1,990,751 | Ralston et al. | Feb. 12, 1935 |
| 2,204,113 | Allen | June 11, 1940 |
| 2,237,374 | Smith | Apr. 8, 1941 |
| 2,271,319 | Thomas et al. | Jan. 27, 1942 |
| 2,285,396 | Danforth et al. | June 9, 1942 |
| 2,287,700 | Muskat et al. | June 23, 1942 |
| 2,512,053 | Calmon | June 20, 1950 |